US006064968A

United States Patent [19]
Schanz

[11] Patent Number: 6,064,968
[45] Date of Patent: May 16, 2000

[54] SYSTEMS, METHODS AND COMPUTER PROGRAM PRODUCTS FOR IDENTIFYING UNIQUE AND COMMON LEGAL REQUIREMENTS FOR A REGULATED ACTIVITY AMONG MULTIPLE LEGAL JURISDICTIONS

[76] Inventor: Stephen J. Schanz, 716 Misty Isle Pl., Raleigh, N.C. 27615

[21] Appl. No.: 09/139,502

[22] Filed: Aug. 25, 1998

[51] Int. Cl.[7] ................................... G06F 17/60
[52] U.S. Cl. ................... 705/1; 705/2; 707/924; 707/925; 707/933; 707/934
[58] Field of Search ................... 705/1, 2, 4, 3, 705/7; 706/924, 925, 933, 934; 707/104

[56] References Cited

U.S. PATENT DOCUMENTS

| | | | |
|---|---|---|---|
| 3,810,102 | 5/1974 | Parks, III et al. | 340/172.5 |
| 3,872,448 | 3/1975 | Mitchell, Jr. | 340/172.5 |
| 4,817,050 | 3/1989 | Komatsu et al. | 364/900 |
| 5,005,143 | 4/1991 | Altschuler et al. | 364/554 |
| 5,099,424 | 3/1992 | Schneiderman | 364/413.02 |
| 5,164,897 | 11/1992 | Clark et al. | 705/1 |
| 5,216,612 | 6/1993 | Cornett et al. | 364/468 |
| 5,301,105 | 4/1994 | Cummings, Jr. | 364/401 |
| 5,359,509 | 10/1994 | Little et al. | 364/401 |
| 5,486,999 | 1/1996 | Mebane | 364/401 |
| 5,517,405 | 5/1996 | McAndrew et al. | 364/401 |
| 5,544,044 | 8/1996 | Leatherman | 364/401 |
| 5,572,422 | 11/1996 | Nematbakhsh et al. | 395/203 |
| 5,583,758 | 12/1996 | McIlroy et al. | 395/202 |
| 5,594,638 | 1/1997 | Iliff | 395/203 |

OTHER PUBLICATIONS

"Document Comparison with Windows", Office Technology Review, [online], vol. 4; Issue 5, pp. 1–3, May 1995, [retrieved on 1999–09–27]. Retrieved Dr. Link [retrieved on Sep. 9, 1999].

Enflex Enviromental Health and Safety Databases [online]. IHS Environmental Information, Inc., 1997 [retrieved on Sep. 27, 1999]. Retrieved from the Internet: <URL: http://www.ihsenv.com/preview/preview.cgi/trydb.htmo?email=&dayphone=&lastname=&company=>.

*Primary Examiner*—James P. Trammell
*Assistant Examiner*—Chinor M. Lee
*Attorney, Agent, or Firm*—Myers Bigel Sigley & Sajovec, P.A.

[57] ABSTRACT

Systems, methods and computer program products facilitate user compliance with laws that pertain to a regulated activity in each of a plurality of legal jurisdictions. A user selects, via a user interface in communication with a data processing system, a component that relates to an aspect of the regulated activity. A user also selects, via a user interface in communication with the data processing system, first and second legal jurisdictions from the plurality of legal jurisdictions. In response to the user selections, elements of the selected component that are unique and common to the first and second legal jurisdictions are displayed. Each displayed element is a legal requirement associated with the regulated activity as defined by laws of a respective legal jurisdiction.

111 Claims, 11 Drawing Sheets

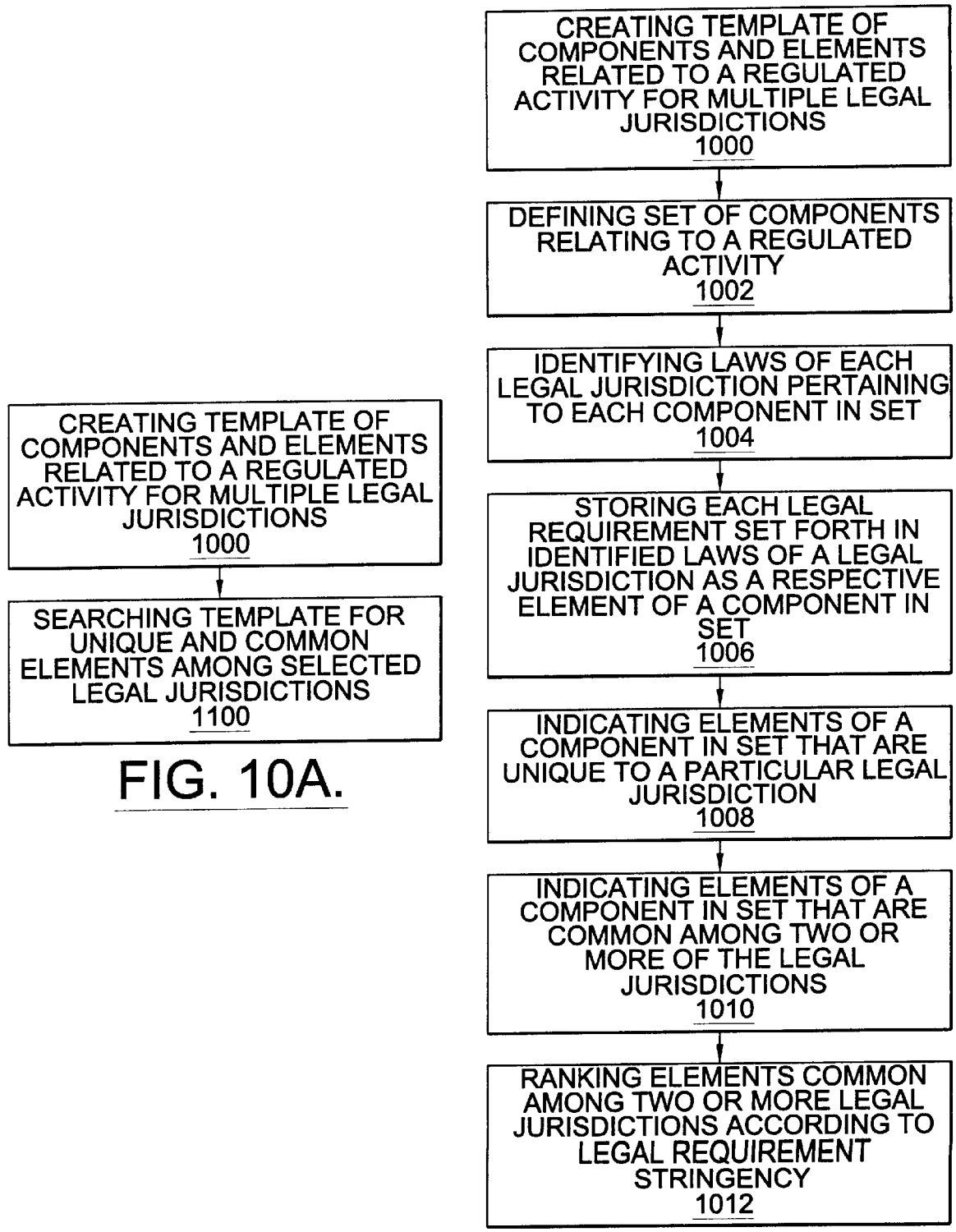

SYSTEMS, METHODS AND COMPUTER PROGRAM PRODUCTS FOR IDENTIFYING UNIQUE AND COMMON LEGAL REQUIREMENTS FOR A REGULATED ACTIVITY AMONG MULTIPLE LEGAL JURISDICTIONS

FIELD OF THE INVENTION

The present invention relates generally to regulated activities and, more particularly, to systems, methods and computer program products for facilitating compliance with laws pertaining to regulated activities.

BACKGROUND OF THE INVENTION

Health care has become a highly regulated activity. Physicians, nurses, nurse practitioners, physician assistants, pharmacists, chiropractors, dentists, and the like (collectively referred to hereinafter as "health care providers") are subject to many laws and regulations governing various aspects of health care, both on the municipal, state and federal level. Exemplary laws and regulations include, but are not limited to, licensure, medical records, informed consent, confidentiality, licensure exceptions, exclusions and exemptions, and disciplinary laws.

Health care providers practicing in more than one legal jurisdiction (e.g., two or more states) may need to be cognizant of the laws and regulations governing health care in each jurisdiction. For example, a home care nurse employed with a home care agency in southwestern Michigan may visit patients across the state line in a neighboring legal jurisdiction, such as Indiana or Illinois. The home care nurse typically will be required to adhere to the laws governing health care in each of these legal jurisdictions. However, Illinois may have a law governing scope of practice that is drastically different from the governing law of Indiana. Because there is not a uniform set of health care provider laws, a health care provider is typically held accountable under the laws of each legal jurisdiction. Unfortunately, staying abreast of all statutes, rules and regulations governing health care, especially for many legal jurisdictions, may be a difficult task.

In addition, a health care provider may need to be aware of laws and regulations of other legal jurisdictions even when the health care provider does not physically enter into another legal jurisdiction. With the advent of telemedicine (also referred to as "telehealth" for practitioners other than physicians), a physician examining a patient in Montana may wish to "consult" with a medical specialist in Minnesota. Using telemedicine equipment (i.e., computers, cameras, monitors, phone lines and the like) the patient in Montana may be able to be effectively "examined" by the medical specialist in Minnesota via real-time audio and video transmissions. Many states currently have laws stating that any health care provider caring for a patient within the state must be licensed in the state. Thus, the medical specialist in Minnesota may need to be licensed in Montana. Unfortunately, it may be difficult and time consuming for the medical specialist in Minnesota to stay abreast of the laws in another legal jurisdiction, such as Montana, before rendering health care to a patient.

As more and more health care providers are faced with practicing across state lines, a need for quickly and accurately determining the legal requirements within a particular legal jurisdiction exists. Furthermore, health care providers intending to provide medical services via telemedicine may find it difficult to stay abreast of all the statutes, laws and regulations of all fifty states, as well as the various municipalities that regulate health care. However, without knowledge of the law, health care providers may find themselves in violation of various statutes, rules and regulations.

Keyword searches of databases containing laws of various legal jurisdictions may not return complete and accurate listings of all laws relating to the keywords. One reason for this is that different terms may be used for the same item. For example, one legal jurisdiction may use the term "telemedicine" in its laws. Another legal jurisdiction may use the term "electronic diagnosis" in lieu of the term "telemedicine." Accordingly, unless a user knows all possible terms that can be used for a particular item, keyword searches are subject to inaccuracies and incomplete search results.

SUMMARY OF THE INVENTION

In view of the above discussion, it is an object of the present invention to allow health care providers to quickly and accurately determine the statutes, rules and regulations related to health care within any legal jurisdiction.

It is another object of the present invention to facilitate the implementation of the practice of telemedicine by helping health care providers comply with the statutes, rules and regulations of any legal jurisdiction.

It is another object of the present invention to facilitate thorough and accurate searches of various laws of multiple legal jurisdictions without requiring the use of keywords.

These and other objects of the present invention are provided by methods, systems and computer program products which facilitate user compliance with laws that pertain to a regulated activity in each of a plurality of legal jurisdictions. A user selects, via a user interface in communication with a data processing system, a component that relates to an aspect of the regulated activity. A user also selects, via a user interface in communication with the data processing system, first and second legal jurisdictions from the plurality of legal jurisdictions. In response to the user selections, elements of the selected component that are unique to the first and second legal jurisdictions, respectively, are displayed. In addition, elements of the selected component that are common to both the first and second legal jurisdictions are displayed. Each displayed element is a legal requirement associated with the regulated activity as defined by laws of a respective legal jurisdiction.

According to another aspect of the present invention, a list of elements that comply with the laws of both the first and second legal jurisdiction with respect to a selected regulated activity component may be displayed. Accordingly, using the present invention, a user can quickly determine how to comply with the legal requirements of both jurisdictions without having to study and compare the legal requirements of each jurisdiction.

Preferably, for the displayed elements common to both the first and second legal jurisdictions, an indication as to which of the displayed elements are associated with the first legal jurisdiction and which of the displayed elements are associated with the second legal jurisdiction are displayed. Also, for the displayed elements common to both the first and second legal jurisdictions, an indication is preferably made as to whether the first or second legal jurisdiction has laws associated with each common element that are more stringent than laws of the respective other legal jurisdiction.

The unique and common elements may be displayed to a user in various formats. According to one format, elements of the first legal jurisdiction may be displayed within a first portion of a user interface and elements of the second legal jurisdiction may be displayed within an adjacent second portion of the user interface. In addition, a user may view the laws of each legal jurisdiction that are associated with any of the respective displayed common and unique elements.

For each regulated activity, a template is created that contains various components and elements of the regulated activity. A set of components for a regulated activity is initially defined, wherein each component in the set relates to a respective aspect of the regulated activity. For each component in the set, laws of each legal jurisdiction that pertain to the respective component are identified. Each legal requirement set forth in the identified laws of a legal jurisdiction are then stored in a data processing system as a respective element of a component in the set.

During template construction, the elements of a component in the set that are unique to a particular legal jurisdiction are identified. The elements of a component in the set that are common among two or more of the legal jurisdictions are also identified. In addition, the elements common among two or more of the legal jurisdictions are ranked according to legal requirement stringency.

According to another aspect of the present invention, a method of practicing telemedicine using a first computer system in a first legal jurisdiction that is networked to a second computer system in a second legal jurisdiction is provided. As used herein, the term "telemedicine" incorporates the term "telehealth" and focuses on the use of information technology to deliver medical and health care services from one location to another. Information technology and the delivery of medical and health care services includes the delivery, diagnosis, consultation, treatment, transfer of medical data, or exchange of medical information by means of audio, video, or data communications, excluding consultations via telephone or facsimile transmission. A health care provider, such as a physician located in a first legal jurisdiction, selects, via a user interface in communication with the first computer system, a component that relates to an aspect of telemedicine. The physician also selects, via a user interface in communication with the first computer system, the first and second legal jurisdictions from the plurality of legal jurisdictions.

In response to the physician's selections, elements of the selected component that are unique to the first and second legal jurisdictions, respectively, are displayed. In addition, elements of the selected component that are common to both the first and second legal jurisdictions are also displayed. Each displayed element is a legal requirement associated with telemedicine as defined by laws of a respective legal jurisdiction. If the physician is satisfied that he or she is in compliance with the displayed elements, the practice of telemedicine may commence.

The present invention is advantageous because a user can quickly and easily determine the legal requirements in each of a plurality of legal jurisdictions regarding a regulated activity. For example, with respect to health care, a health care provider utilizing the present invention can quickly and easily determine what the various statutes, rules and regulations are in various states. Furthermore, the present invention can identify to a user what the most stringent laws are among two or more legal jurisdictions. Accordingly, a user complying with the list of stringent laws will comply with each of the legal jurisdictions in question.

In a given legal jurisdiction, all, some, or none of the elements of a component (or sub-component) of a specific regulated activity may be applicable. According to the present invention, the components and elements of each regulated activity are organized into a format that allows varied and disparate laws to be organized into a format that facilitates comparison and analysis.

Another advantage of the present invention is that keyword searches, which can be inaccurate and incomplete, are not necessary for locating laws relating to a regulated activity in multiple legal jurisdictions.

BRIEF DESCRIPTION OF THE DRAWINGS

FIGS. 10A–10C schematically illustrate operations for creating a database of laws of multiple legal jurisdictions and for searching and displaying unique and common elements among multiple legal jurisdictions, according to the present invention.

DETAILED DESCRIPTION OF THE INVENTION

Figure 1:
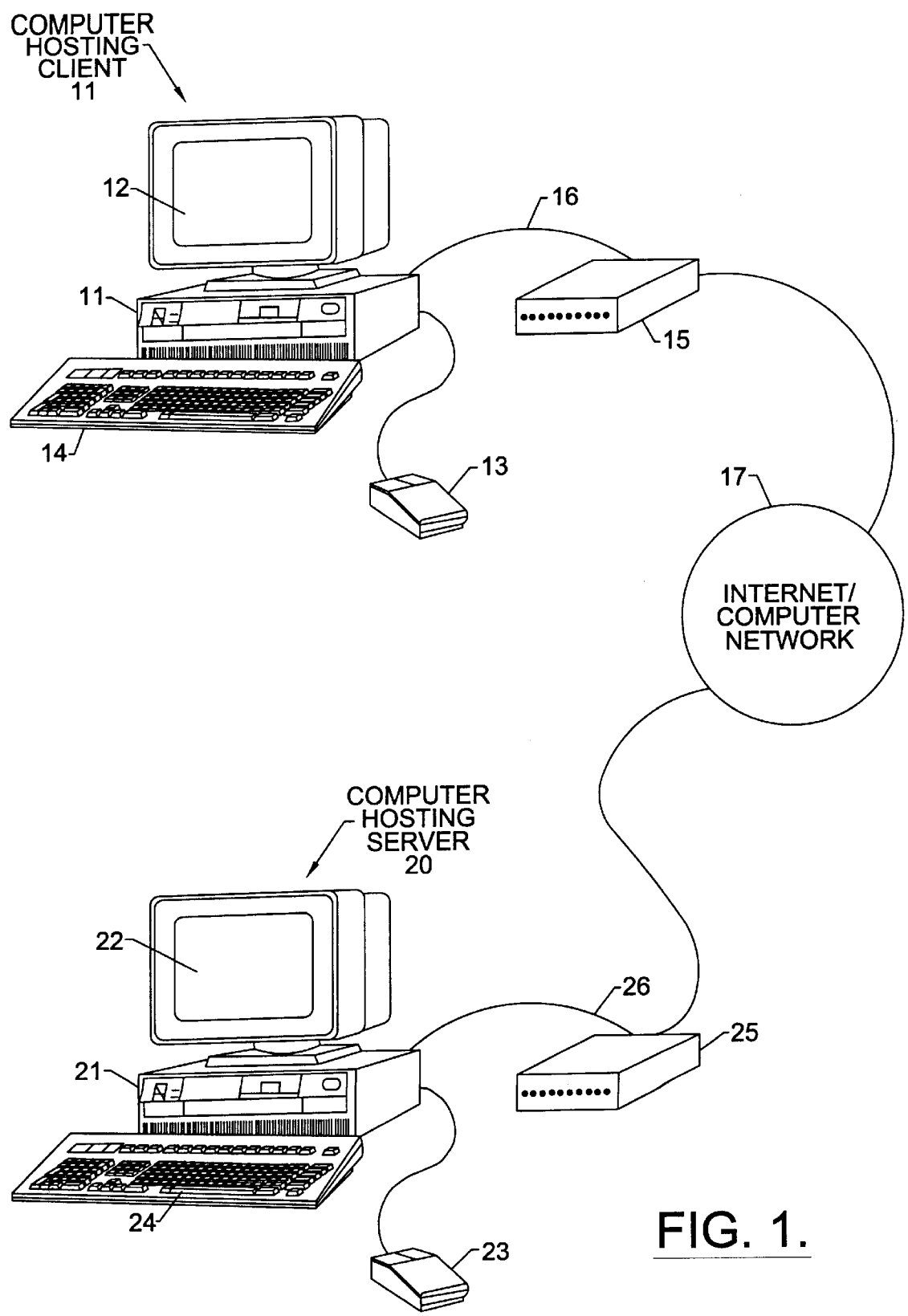
FIG. 1 illustrates a first computer system in communication with a second computer system in a client/server environment.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The present invention will now be described more fully hereinafter with reference to the accompanying drawings, in which preferred embodiments of the invention are shown. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java®, Smalltalk or C++. However, the computer program code for carrying out operations of the present invention may also be written in conventional procedural programming languages, such as the "C" programming language. The program code may execute entirely on the user's computer, as a stand-alone software package, or it may execute partly on the user's computer and partly on a remote computer. In the latter scenario, the remote computer may be connected to the user's computer through a LAN or a WAN, or the connection may be made to an external computer (for example, through the Internet using an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

It is to be understood that the present invention may be utilized in conjunction with statutes, laws, and regulations relating to any type of regulated activity. The present invention is not limited to the regulated activity of health care.

Creating Database of Laws Related to Regulated Activity for Legal Jurisdictions

Initially, a template containing statutes, rules and regulations (collectively referred to hereinafter as "laws") pertaining to a regulated activity is created for legal jurisdictions of interest. An exemplary template would include the laws of each state pertaining to the regulation of health care.

A preferred embodiment of a template, according to the present invention, is a database. As is known to those skilled in the art, a database is a collection of data that is organized so that the data can be easily accessed, managed, and updated. A database, or databases, according to the present invention may be a relational database, distributed database, or object oriented database.

Template creation, according to the present invention, generally follows a two-step process. For each regulated activity, specific aspects of the regulated activity (hereinafter referred to as "components") are initially defined. Then a determination is then made whether each legal jurisdiction of interest has laws pertaining to each defined component. The term "legal jurisdiction" shall be understood to include all types of geographically-delineated areas of authority, including, but not limited to, countries, states, counties, and municipalities.

Defining Specific Activities That Constitute Regulated Activity

According to the present invention, components of a "regulated activity" are initially defined. With respect to the regulated activity "health care", exemplary components may include, but are not limited to, "the practice of medicine", "nursing", "pharmacy", and the like. Legal requirements or elements for each of these components are typically found in the various laws promulgated by a legal jurisdiction. According to the present invention, for each legal jurisdiction of interest, the respective laws relating to a regulated activity are perused, legal requirements (elements) are isolated and then the elements are formatted into a common template of components.

Table 1 illustrates an exemplary template wherein the regulated activity "health care" is divided into components.

TABLE 1

Health Care

Physician

| Licensure | Medical Records | Informed Consent | Telemedicine |
| --- | --- | --- | --- |

In Table 1, the regulated activity "health care" has a component "physician" which, in turn, has four components: "licensure", "medical records", "informed consent" and "telemedicine". Each of these components may have respective components as illustrated in Table 2.

TABLE 2

| Licensure | 1. Scope of practice |
| --- | --- |
|  | 2. License exceptions |
|  | 3. License exclusions |
|  | 4. License exemptions |
| Medical Records | 1. Content |
|  | 2. Retention |
|  | 3. Destruction |
| Informed Consent | 1. Definition |
|  | 2. Process for obtaining |
| Telemedicine | 1. Reimbursement |
|  | 2. Medical records |

As shown in Table 2, the component licensure from Table 1 is further broken down into respective components: "scope of practice", "license exceptions", "license exclusions", and "license exemptions". The component medical records is further broken down into respective components: "content", "retention" and "destruction". The component informed consent is further broken down into respective components: "definition" and "process for obtaining". The component telemedicine is further broken down into respective components: "reimbursement" and "medical records".

Components (and components of components, etc.) of a regulated activity will typically be composed of various legal requirements (hereinafter referred to as "elements") that are set forth in narrative form in the laws of a legal jurisdiction. Table 3 below illustrates exemplary elements of the component "physician's scope of practice". For each component, a template is developed that preferably contains most of the elements of a regulated activity set forth in the laws of various legal jurisdictions. Preferably, each such template can be modified to add, delete and amend elements according to changes made to the various laws.

TABLE 3

| Scope of Practice/Physician |
| --- |
| A. Diagnose |
| B. Treat |
| C. Correct Ailment/Disease |
| D. Hold Oneself Out As Capable of A,B,C |
| E. Hold Oneself Out as Physician |
| F. Prescribe and Furnish Medicine |
| G. Perform Surgery |
| H. Suggest, Recommend, Prescribe Treatment |
| I. One Who Uses Title of "MD", "Surgeon", "Doctor" |
| J. Maintain Office to Exam or Treat |
| K. Out-of-State Person, Through Any Medium, Performing "Healing Arts" for Compensation (Unless Falling In Exceptions) |
| L. Investigate Disease/Ailment |
| M. Prevention of Disease/Ailment |
| N. Refers Also To Medicine and Obstetrics |
| O. Hypnosis for Treatment |

It is understood that the present invention is not limited to the illustrated templates of components and elements. Various formats may be utilized, without limitation, for parsing the legal requirements (elements) set forth in the laws of a legal jurisdiction. For example, components may have components, which may have components. The primary objective of using the term "components", however, is to facilitate organization of the legal requirements of differently worded and arranged laws from multiple legal jurisdictions into a format that facilitates quick and accurate comparisons among the various legal jurisdictions of the respective legal requirements for a regulated activity.

Determining Whether Each Legal Jurisdiction Regulates A Defined Activity

Once a template for a regulated activity has been created, the next step includes identifying the laws of each legal jurisdiction of interest that pertain to each component in the template. Table 4 below illustrates the identification of legal jurisdictions having laws relating to the defined elements for the component "scope of practice/physician".

TABLE 4

| Scope of Practice/Physician | MT | NE | IO | ND | SD | MN |
| --- | --- | --- | --- | --- | --- | --- |
| A. Diagnose | X | | X | | X | |
| B. Treat | X | | X | | X | X |
| C. Correct Ailment/Disease | X | | X | | X | X |
| D. Hold Oneself Out As Capable of A,B,C | X | X | X | | | |
| E. Hold Oneself Out as Physician | | | X | X | X | X |
| F. Prescribe and Furnish Medicine | | X | X | | X | X |
| G. Perform Surgery | | X | | X | X | X |
| H. Suggest, Recommend, Prescribe Treatment | | X | | X | | |
| I. One Who Uses Title of "MD", "Surgeon", "Doctor" | | X | | X | | X |
| J. Maintain Office to Exam or Treat | | X | | X | | |
| K. Out-of-State Person, Through Any Medium, Performing "Healing Arts" for Compensation (Unless Falling In Exceptions) | | X | | | | |
| L. Investigate Disease/Ailment | | | | X | | |
| M. Prevention of Disease/Ailment | | | | X | | X |
| N. Refers Also To Medicine and Obstetrics | | | | | | |
| O. Hypnosis for Treatment | | | | | | X |

Because the laws of various legal jurisdictions are initially perused and identified within the template, sophisticated filtering engines and keywords are not required to perform a search. Using a template, according to the present invention, the identification of the legal requirements for a regulated activity set forth by the laws of any legal jurisdiction can be performed quickly and efficiently, regardless of the wording and/or format of the laws.

As illustrated in Table 4, Montana has two elements of the component "scope of practice/physician" which are unique to Montana in comparison with Minnesota. These unique elements are "diagnose" and "hold oneself out as capable of diagnosing, treating, or correcting an ailment/disease". Minnesota, in turn, has six elements which are unique in comparison with Montana. These unique elements are "holding oneself as a physician", "prescribe and furnish medication", "perform surgery", "one who uses the title of 'MD', 'doctor', or 'surgeon'", "prevention of disease/ailment", and "hypnosis for treatment". In the illustrated template, both Minnesota and Montana have common elements with respect to the component "scope of practice/physician". These common elements are "treat", and "correct an ailment/disease".

According to another aspect of the present invention, the elements pertaining to each component of a regulated activity may be ranked according to legal requirement "stringency", typically on a scale ranging from "least stringent" to "most stringent". As a result, for a given element, the stringency of the corresponding law of each jurisdiction can be known.

For example, for the element "perform surgery" of the component "scope of practice/physician" (Table 3), the elements for each legal jurisdiction are ranked on a predefined scale of stringency. Accordingly, a template according to the present invention can reflect how stringent the laws of each legal jurisdiction are with respect to one another with respect to a physician performing surgery. As a result, when a user desires to determine how to comply with the laws of multiple legal jurisdictions, he or she will also be able to quickly ascertain which legal jurisdiction has the more stringent laws for a given aspect of a regulated activity.

Referring to Table 5 below, stringency is illustrated for the elements of the component "telemedicine—informed consent". As illustrated, California laws require both oral and written informed consent. By contrast, Oklahoma laws require only informed consent, not both oral and written informed consent. Accordingly, California's laws, with respect to this element, are more stringent than those of Oklahoma. Various methods of ranking elements, according to the present invention may be utilized without limitation. In the illustrated embodiment of Table 5, the element for California has a rank of 1 and the element of Oklahoma has a ranking of 2.

TABLE 5

Telemedicine - Informed Consent

| State | Element | Stringency |
|---|---|---|
| California | Requires both written and oral informed consent | More stringent (Rank = 1) |
| Oklahoma | requires informed consent | Less stringent (Rank = 2) |

The creation of a template, according to the present invention, preferably includes storing (e.g., within a local or remote database) the actual text of each law related to each element of a component of a regulated activity. Various ways of storing data for future retrieval are well known and need not be described herein.

Hardware and Software for Implementing the Present Invention

A template according to the present invention may be stored locally on a user's stand-alone computer terminal, such as a desktop computer, laptop computer, palmtop computer, or personal digital assistant (PDA). Exemplary stand-alone computers may include, but are not limited to, Apple®, Sun Microsystems®, IBM®, or IBM®-compatible personal computers. Accordingly, the present invention may be carried out via a single computer system, such as a desktop computer or laptop computer.

According to a preferred embodiment, a template may be centrally stored within one or more computers accessible to multiple users. Accordingly, users may access a central template through a private or public computer network in a conventional manner via wireline or wireless communications. By maintaining a template in a central location, updates can be made to the template as laws are added, amended or deleted in the various legal jurisdictions. Accordingly, users can be provided with up-to-date information on regulated activities.

The present invention is preferably practiced within a client/server programming environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

Many business applications being written today use the client/server model as does the Internet's main program, TCP/IP. Typically, multiple client programs share the services of a common server program. Both client programs and server programs are often part of a larger program or application. Relative to the Internet, a Web browser is a client program that requests services (the sending of Web pages or files) from a Web server (which technically is called a Hypertext Transport Protocol or HTTP server) in another computer somewhere on the Internet. Similarly, a computer with TCP/IP installed allows client requests for files from File Transfer Protocol (FTP) servers in other computers on the Internet.

As is known to those with skill in this art, client/server environments may include public networks, such as the Internet, and private networks often referred to as "Intranets" and "Extranets."The term "Internet" shall incorporate the terms "Intranet" and "Extranet" and any references to accessing the Internet shall be understood to mean accessing an Intranet and/or and Extranet, as well. The term "computer network" shall incorporate publicly accessible computer networks and private computer networks.

FIG. 1 illustrates a client/server computing system in which the present invention may be embodied. In the illustrated system, a remote user's computer 10 has a client application resident thereon and a host computer 20 has a server application resident thereon. The user's computer 10 preferably includes a central processing unit 11, a display 12, a pointing device 13, a keyboard 14, access to persistent data storage, and a communications link 16 for communicating with the host computer 20. The keyboard 14, having a plurality of keys thereon, is in communication with the central processing unit 11. A pointing device 13, such as a mouse, is also connected to the central processing unit 11. The communications link 16 may be established via a modem 15 connected to traditional phone lines, an ISDN link, a T1 link, a T3 link, via cable television, via an ethernet network, and the like. Modem 15 may also be a wireless modem configured to communicate with the modem 25 of the host computer 20 via wireless communications systems. The communications link 16 also may be made by a direct connection of the user's computer 10 to the host computer 20 or indirectly via a computer network 17, such as the Internet, in communication with the host computer 20.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a user's computer 10 and a host computer 20 to store various data transferred from the host computer.

Preferably, a user's computer 10 has an Intel® Pentium® processor (or equivalent) with at least thirty-two megabytes (32 MB) of RAM, and at least five megabytes (5 MB) of persistent computer storage 15 for caching. However, it is to be understood that various processors may be utilized to carry out the present invention without being limited to those enumerated herein. Although a color display is preferable, a black and white display or standard broadcast or cable television monitor may be used. Exemplary user computers having a client application resident thereon may include, but are not limited to, an Apple®, Sun Microsystems®, IBM®, or IBM®-compatible personal computer. A user's computer 10, if an IBM®, or IBM®-compatible personal computer, preferably utilizes either a Windows®3.1, Windows 95®, Windows 98®, Windows NT®, Unix®, or OS/2® operating system. However, other operating systems may also be utilized without limitation. In addition, it is to be understood that a terminal not having computational capability, such as an IBM® 3270 terminal or a network computer (NC), or having limited computational capability, such as a network PC (Net PC) may be utilized in accordance with the present invention for accessing a host computer 20 in a client capacity.

A host computer 20 may have a configuration similar to that of a user's computer 10 and may include a central processing unit 21, a display 22, a pointing device 23, a keyboard 24, access to persistent data storage 25, and a communications link 26 for connecting to the user's computer 10 via a modem 25, or otherwise. It is preferable that a host computer have an Intel® Pentium® processor or equivalent, at least sixteen megabytes (32 MB) of RAM, and at least eight hundred megabytes (800 MB) of data storage. However, a host computer 20 may be implemented using other processors and via other computing devices, including, but not limited to, mainframe computing systems and minicomputers.

It is understood that a user's computer having a client application resident thereon or a host computer having a server application resident thereon or other apparatus configured to execute program code embodied within computer usable media, may operate as means for performing the various functions and carries out the methods of the various operations of the present invention.

The illustrated system of FIG. 1 may be utilized to determine the legal requirements of one or more legal jurisdictions, in accordance with aspects of the present invention. In addition, the system of FIG. 1 may be part of a telemedicine system wherein a health provider located at computer 10 is in communication with a health provider located at computer 20.

A template, according to the present invention may be implemented as a relational database, a distributed database, or an object-oriented database. Exemplary database products with which the present invention may be implemented include, but are not limited to, IBM's DB2, Microsoft's Access and FoxPro, and database products from Oracle, Sybase, and Computer Associates.

Identifying Unique and Common Elements of a Regulated Activity Among Multiple Legal Jurisdictions Using the present invention, a user can quickly and easily identify the unique and common elements of a regulated activity among various legal jurisdictions. For example, a Montana physician wishing to consult about a Montana patient with a medical specialist in Minnesota may need to know how each respective legal jurisdiction (Minnesota and Montana) defines the "practice of medicine." In addition, a Minnesota physician may need to know the legal requirements (elements) of various aspects (components) of a regulated activity in each legal jurisdiction.

Figure 2:
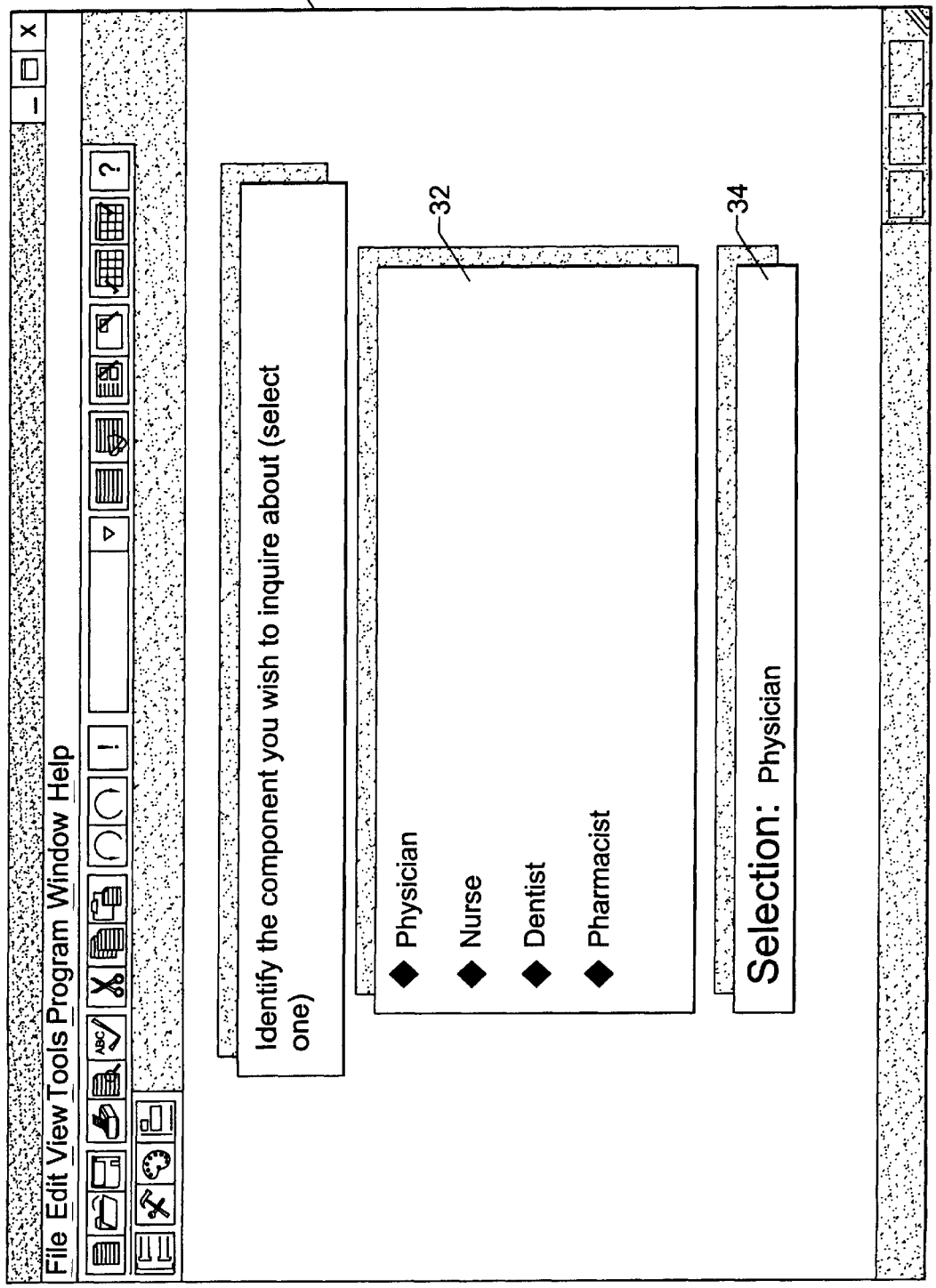
FIG. 2 illustrates a user interface for selecting a regulated activity, according to the present invention.

Referring now to FIGS. 2–9, exemplary user interfaces for identifying and displaying legal requirements of various components of a regulated activity among multiple legal jurisdictions, according to one embodiment of the present invention, are illustrated. In FIG. 2, a user is initially presented with a user interface 30 for selecting a component of a regulated activity. Presented to a user in selection box 32 of the illustrated user interface, are the choices "physician", "nurse", "dentist", "pharmacist". As illustrated in box 34, the user has selected the component "physician".

Figure 3:
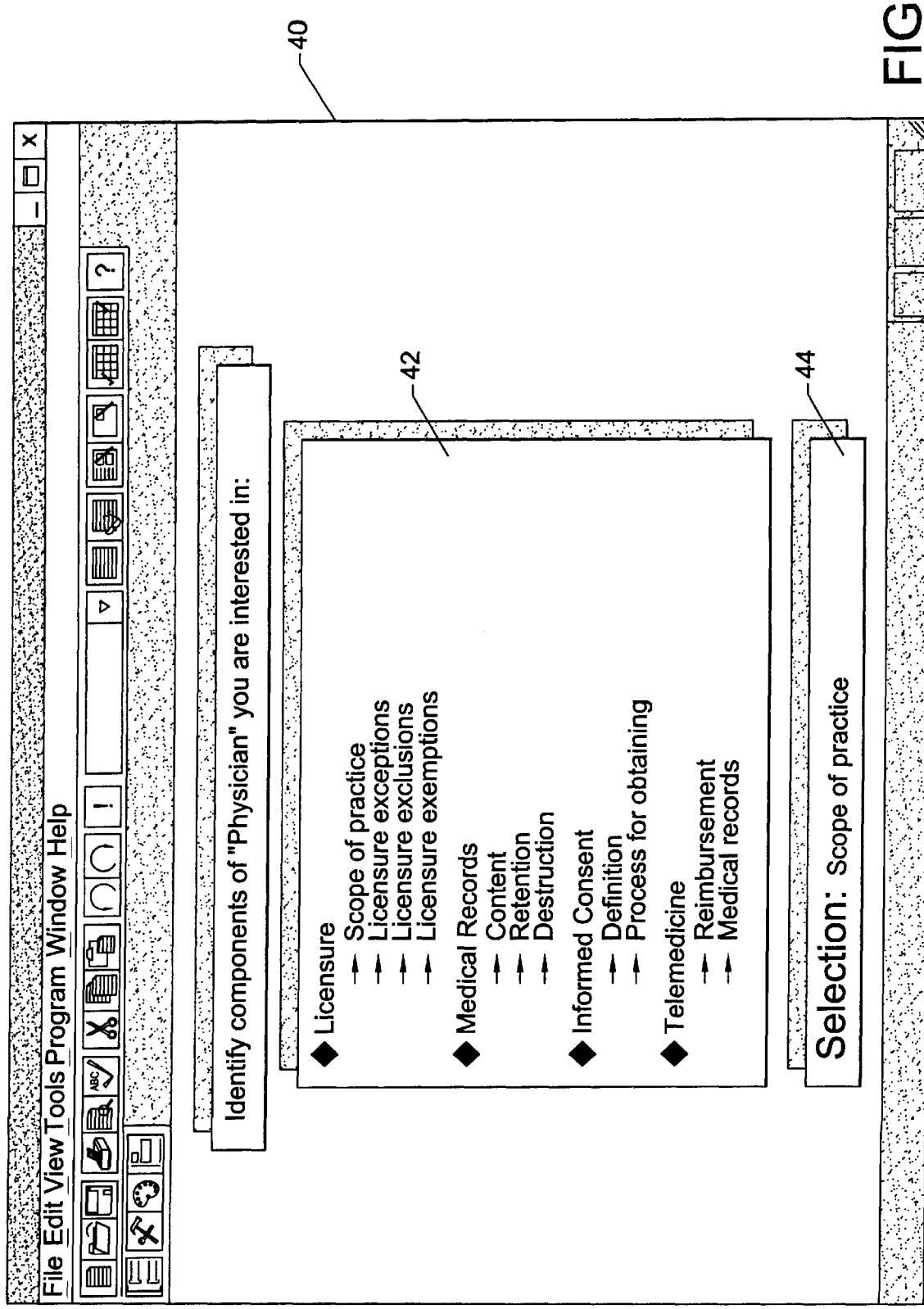
FIG. 3 illustrates a user interface for selecting components and sub-components of the regulated activity selected in the user interface of FIG. 2.

Referring now to FIG. 3, the user is presented with a user interface 40 for selecting components of the component selected in the user interface 30 of FIG. 2. In the illustrated user interface 40, the various components of "physician" are presented to a user in selection box 42. As illustrated in box 44, the user has selected the component "scope of practice" of the component "licensure" for searching.

Figure 4:
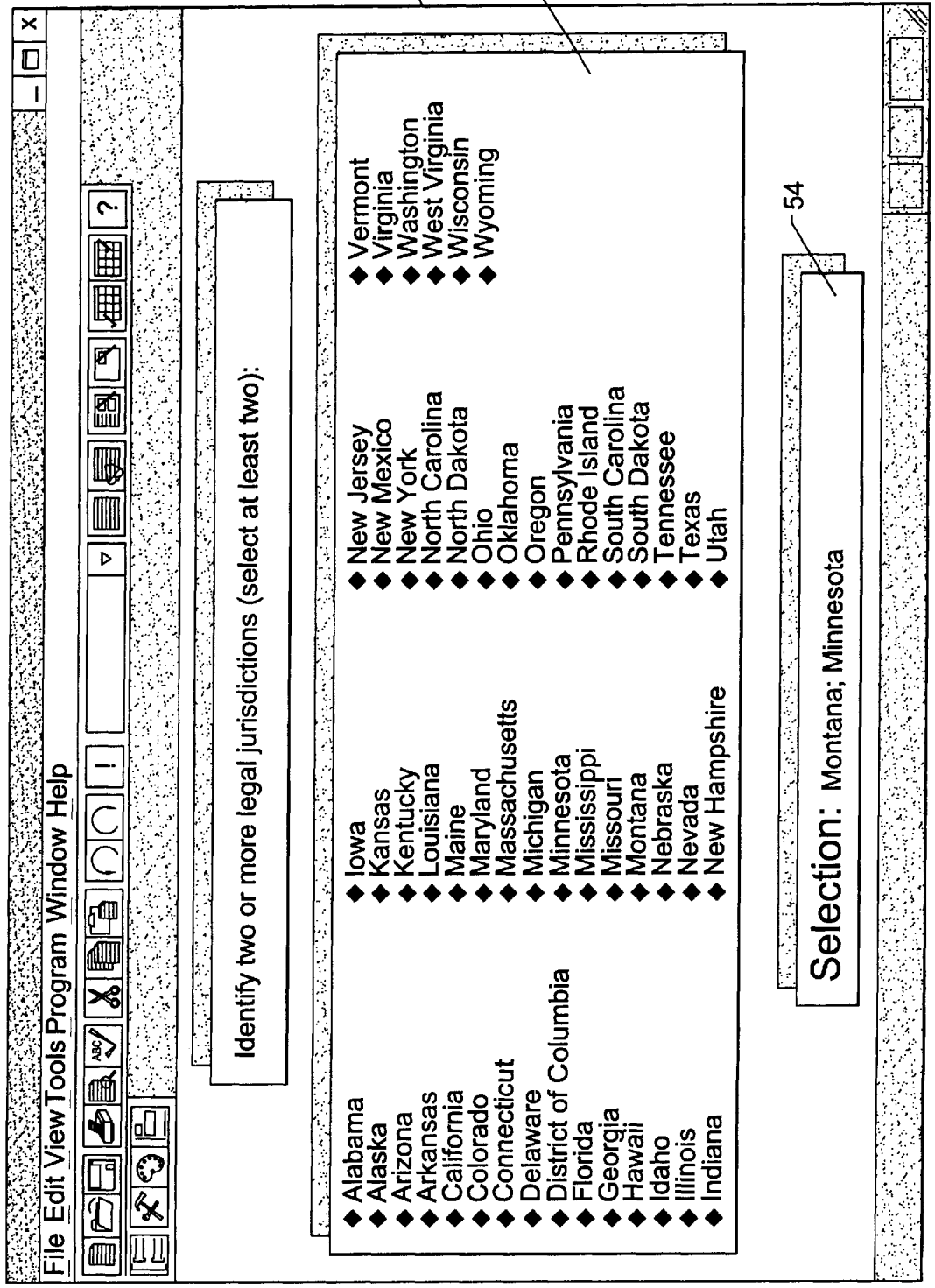
FIG. 4 illustrates a user interface for selecting two or more legal jurisdictions, according to the present invention.

Referring now to FIG. 4, the user is presented with a user interface 50 for selecting two or more legal jurisdictions. In the illustrated user interface 50, the various legal jurisdictions are states and are presented to a user in selection box 52. As illustrated in box 54, the user has selected the states "Montana" and "Minnesota". Accordingly, the user is interested in what laws relate to the scope of practice for a physician within Montana and Minnesota.

Figure 5:
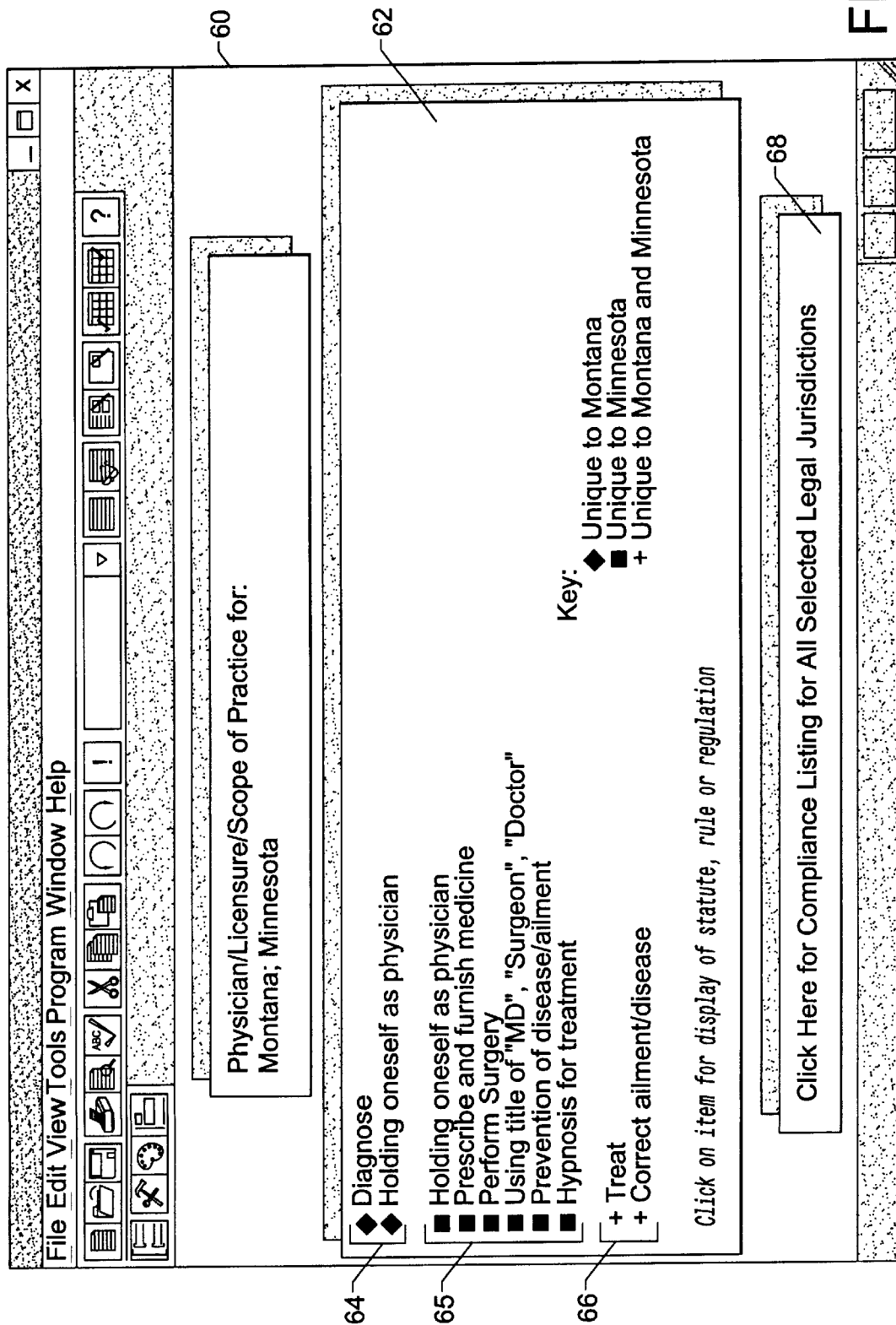
FIG. 5 illustrates a user interface, according to the present invention, presenting to a user a list of unique and common elements of what defines a physician's scope of practice within Montana and Minnesota.

Referring now to FIG. 5, the user, via user interface 60, is presented with a list of unique and common elements of what defines a physician's scope of practice within Montana and Minnesota. This list is generated from a prior-created template, as previously described above. Within box 62 are elements 64 unique to Montana; elements 65 unique to Minnesota; and elements 66 common to both Montana and Minnesota. The actual statute, rule or regulation pertaining to each of the displayed elements 64, 65, 66, may be displayed by activating a respective element (e.g., clicking on an element with a mouse).

Figure 6:
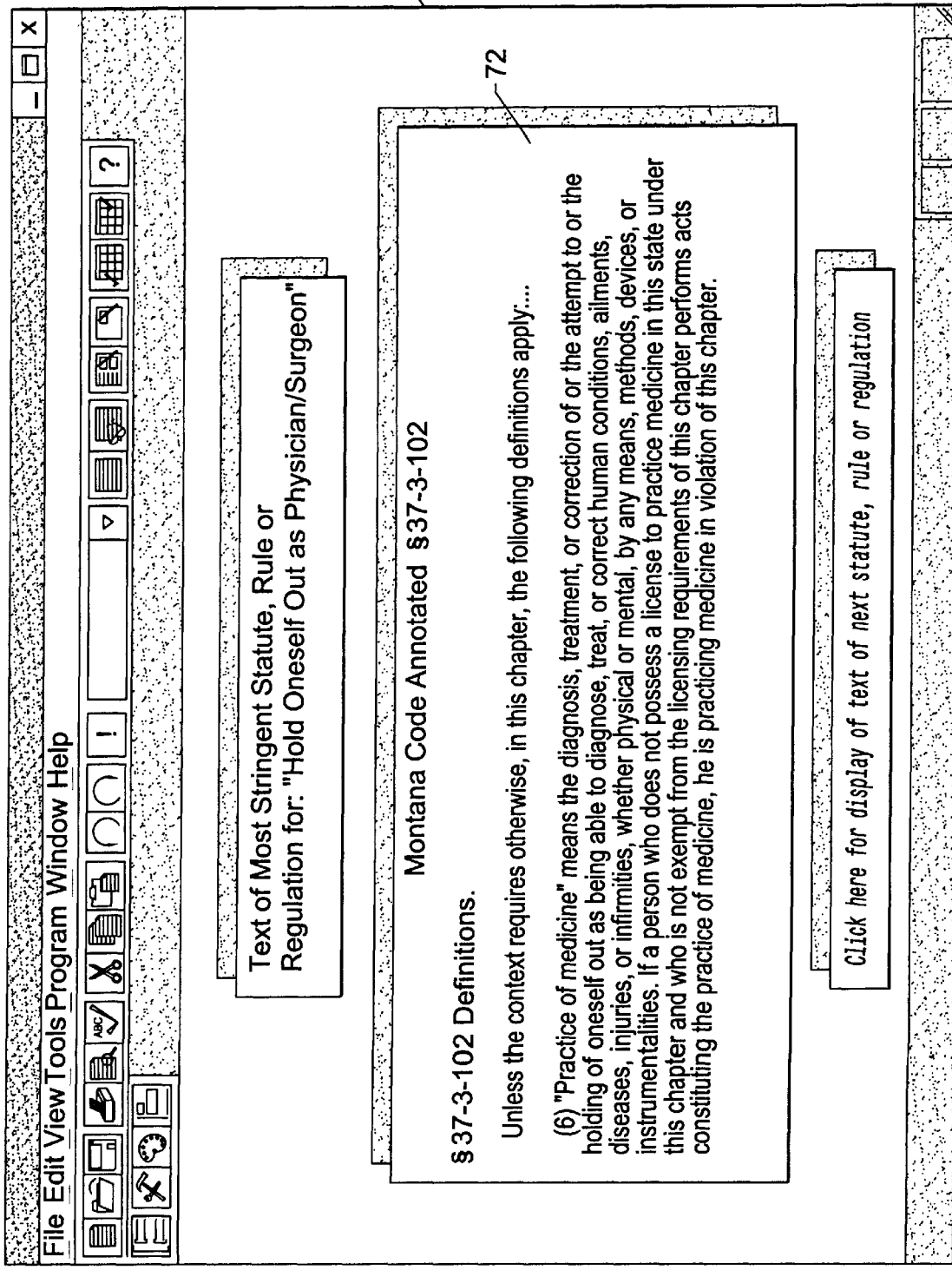
FIG. 6 illustrates a user interface, according to the present invention, for displaying the text of the Montana statute relating to the element "hold oneself out as physician".

An exemplary user interface 70 is illustrated in FIG. 6 having a display box 72 with the text of the Montana statute relating to the element "hold oneself out as physician". Accordingly, the text of each and every law for an element can be quickly and easily displayed by a user without having to resort to other sources.

Figure 7:
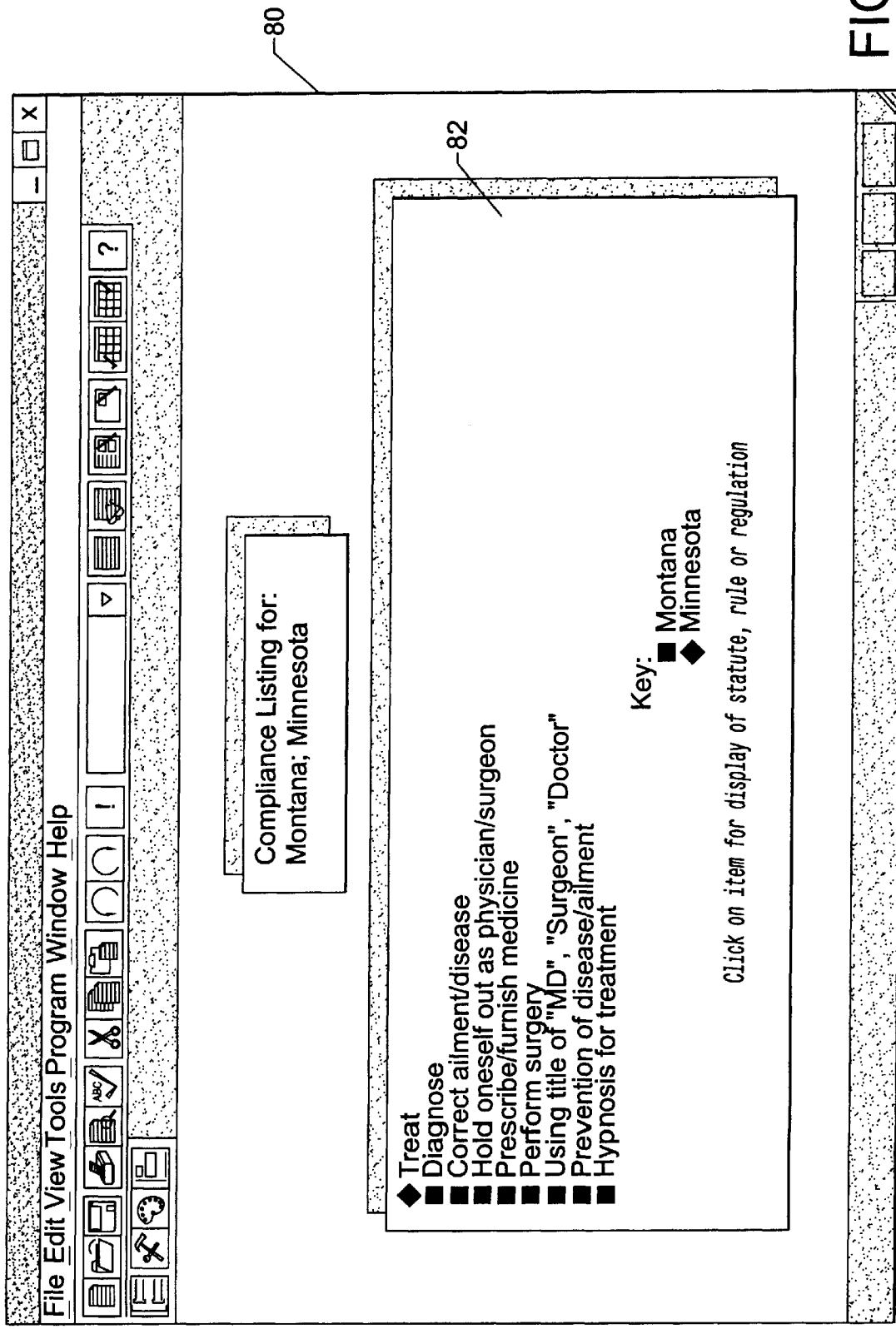
FIG. 7 illustrates a user interface, according to the present invention, containing a compliance listing of elements related to a physician's scope of practice for Montana and Minnesota.

Referring back to FIG. 5, a user can also request a compliance list of elements by clicking on the selection box 68. A compliance listing of elements is a list of laws that, if followed, satisfy the laws of all selected legal jurisdictions with respect to a selected component. The user interface 80 presented in FIG. 7 illustrates a box 82 containing a compliance listing of elements related to a physician's scope of practice for Montana and Minnesota. By adhering to the laws set forth in the compliance list, a user is assured of being in compliance with the laws of each of the selected legal jurisdictions.

Figure 8:
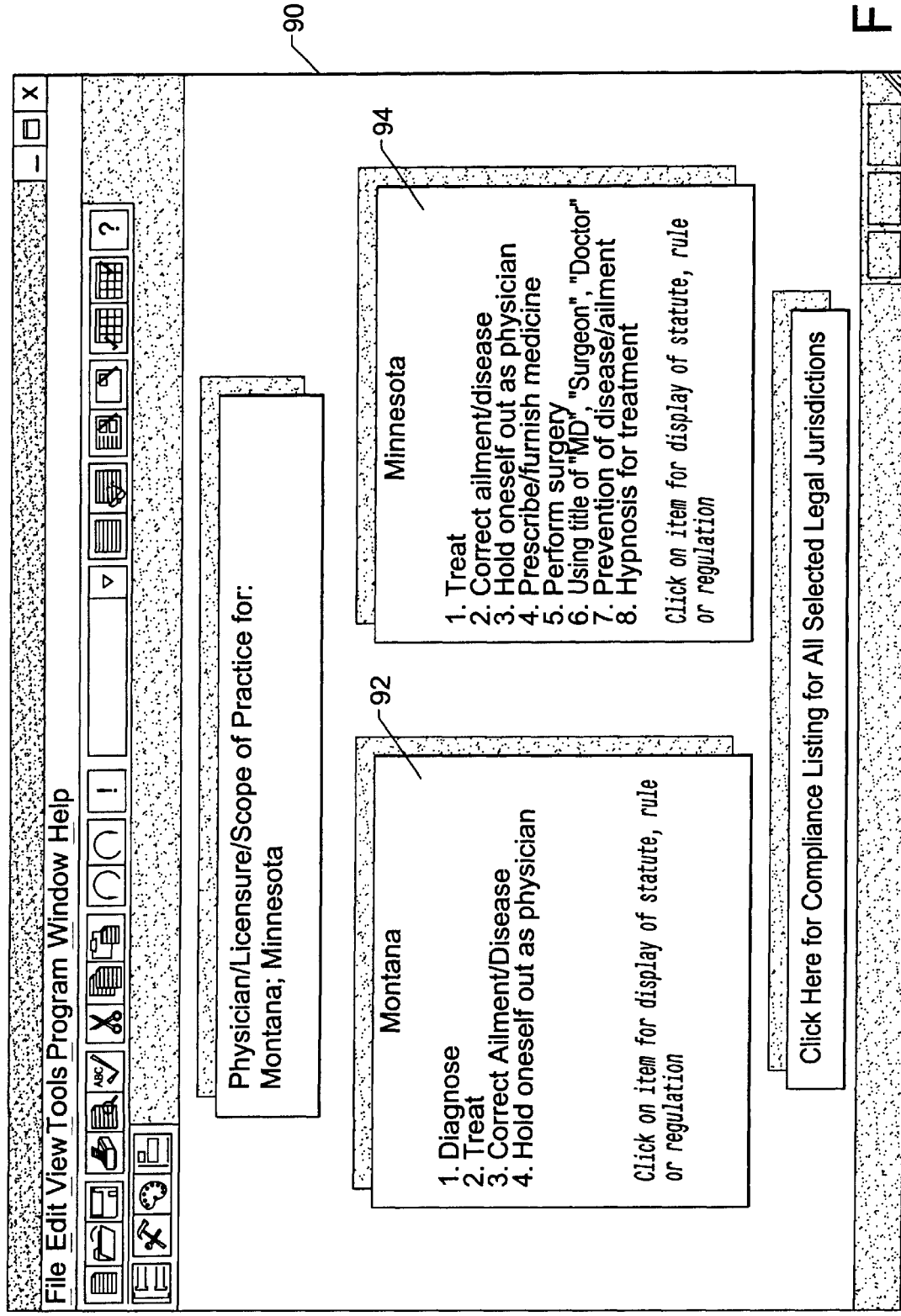
FIG. 8 illustrates an alternative user interface for displaying elements pertaining to a selected element for multiple legal jurisdictions, according to the present invention.

Referring now to FIG. 8, an alternative user interface 90 for displaying elements pertaining to a selected element for multiple legal jurisdictions is illustrated. The elements pertaining to a physician's scope of practice in Montana is displayed in box 92. The elements pertaining to a physician's scope of practice in Minnesota is displayed in adjacent box 94. As described above, the actual statute, rule or regulation pertaining to each of the displayed elements may be displayed within a corresponding display for each state.

Figure 9:
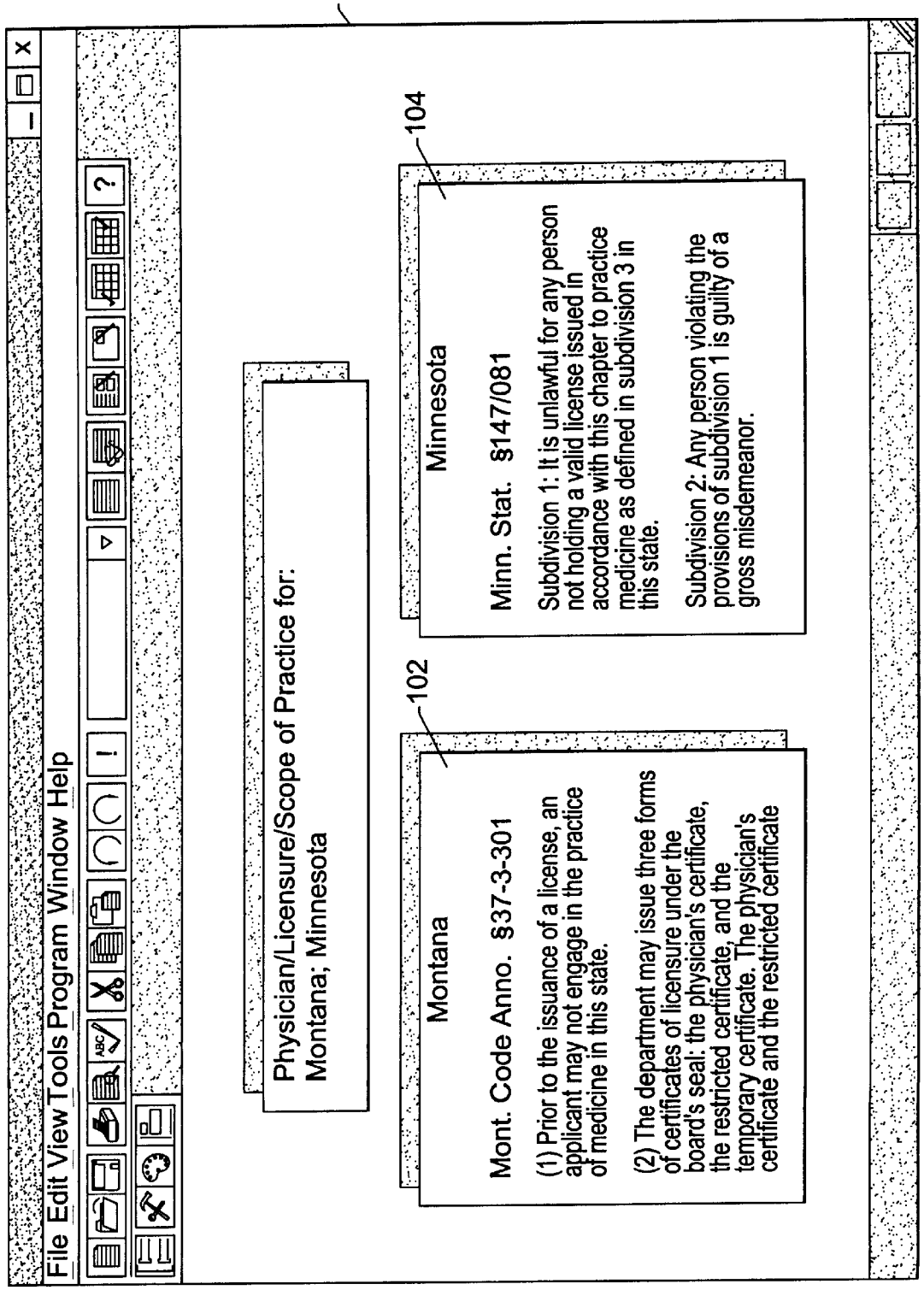
FIG. 9 illustrates the adjacent display of corresponding text for Montana and Minnesota laws related to the element "hold oneself out as a physician".

FIG. 9 illustrates the adjacent display of corresponding text for Montana and Minnesota laws related to the element "hold oneself out as a physician". Within the user interface 100 of FIG. 9, the display box 102 contains the text of the element "hold oneself out as physician" for Montana. The adjacent display box 104 contains the text of the same element for Minnesota. Accordingly, a user can easily and quickly compare the text of any statute, rule or regulation of multiple legal jurisdictions.

It is to be understood that the present invention is not limited to the illustrated user interfaces or to the order of the user interfaces described herein. Various types and styles of user interfaces may be used in accordance with the present invention without limitation.

Referring now to FIG. 10A, operations according to the present invention fall within two modules: creating a template of components and elements related to a regulated activity for multiple jurisdictions (Block 1000); and searching template for unique and common elements among selected legal jurisdictions (Block 1100).

Creating Template

Referring to FIG. 10B, operations for creating a template of components and elements related to a regulated activity for multiple jurisdictions, according to the present invention, includes defining a set of components related to a regulated activity (Block 1002). Laws of each legal jurisdiction pertaining to each component are then perused and identified (Block 1004). Each legal requirement set forth in the identified laws of a legal jurisdiction is stored as an element of a respective component in the set (Block 1006). Elements of each component that are unique to a particular legal jurisdiction are identified (Block 1008). Elements of each component that are common among two or more legal jurisdictions are identified (Block 1010). Also, elements common among two or more legal jurisdictions are ranked according to legal requirement stringency (Block 1012).

Searching Template

Figure 10C:
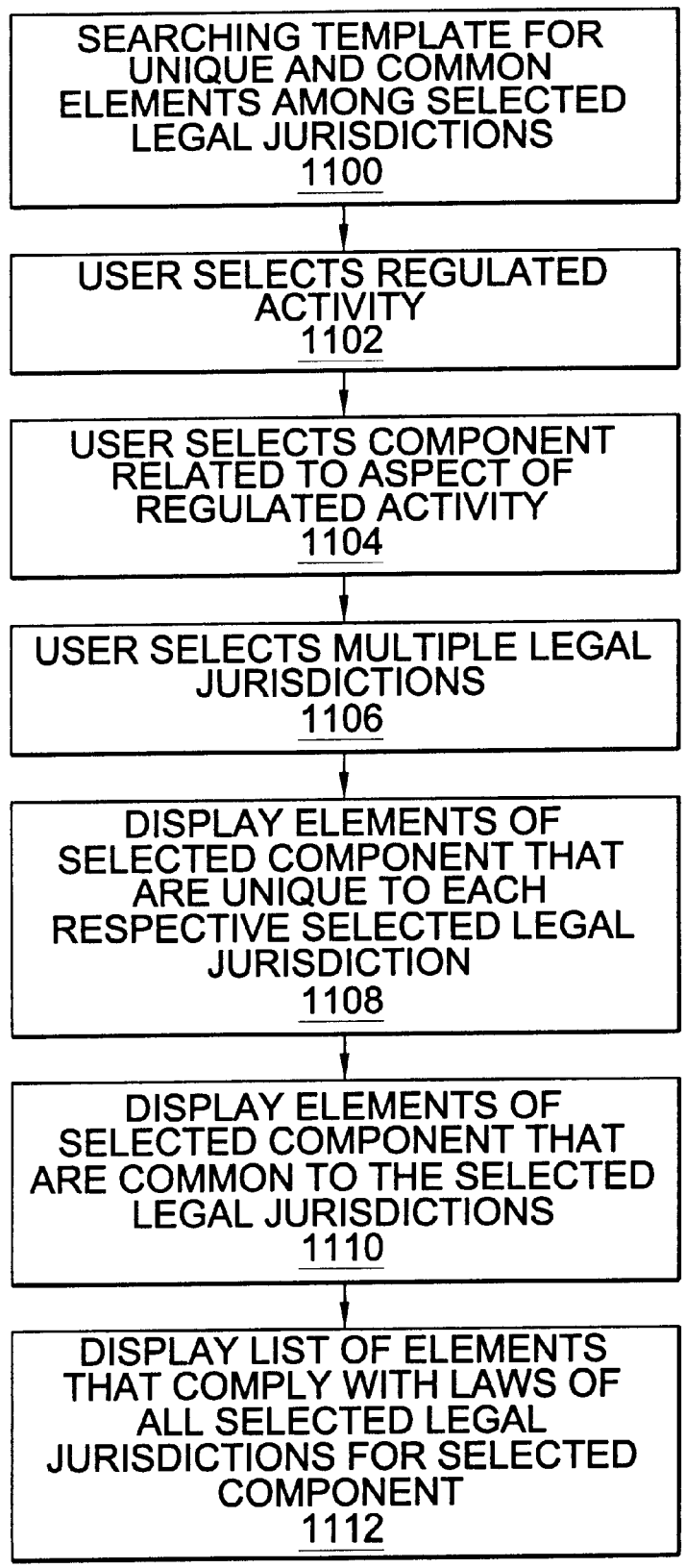

Referring now to FIG. 10C, operations for searching and displaying unique and common elements among multiple legal jurisdictions are illustrated. A user utilizing the present invention initially selects a regulated activity of interest (Block 1102). Next, the user selects a component related to an aspect of the selected regulated activity (Block 1104). The user then selects multiple legal jurisdictions of interest (Block 1106). Component elements that are unique to each respective selected legal jurisdiction are displayed (Block 1108) and component elements that are common among the selected legal jurisdictions are displayed (Block 1110). In addition, a list of elements that comply with the laws of all selected legal jurisdictions may be displayed (Block 1112).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of facilitating user compliance with laws that pertain to a regulated activity in each of a plurality of legal jurisdictions, the method comprising the steps of:

selecting, via a user interface in communication with a data processing system, a component that relates to an aspect of the regulated activity;

selecting, via a user interface in communication with the data processing system, first and second legal jurisdictions from the plurality of legal jurisdictions; and displaying elements of the selected component that are unique to the first and second legal jurisdictions, respectively, wherein each displayed element is a legal requirement associated with the regulated activity as defined by laws of a respective legal jurisdiction.

2. A method according to claim 1 further comprising the step of displaying elements of the selected component that are common to both the first and second legal jurisdictions.

3. A method according to claim 2 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

4. A method according to claim 1 wherein the step of displaying elements of the selected component that are unique to the first and second legal jurisdictions, respectively, further comprises the step of displaying respective portions of the laws of each legal jurisdiction that are associated with the respective displayed elements.

5. A method according to claim 1 wherein the step of displaying elements of the selected component that are common to the first and second legal jurisdictions, respectively, further comprises the step of displaying respective portions of the laws of each legal jurisdiction that are associated with the respective displayed elements.

6. A method according to claim 1 further comprising the step of displaying a list of elements that comply with the laws of both the first and second legal jurisdiction with respect to a selected regulated activity component.

7. A method according to claim 1 further comprising the step of selecting, via a user interface in communication with the data processing system, the regulated activity from a list of regulated activities, prior to the step of selecting a component of the regulated activity.

8. A method according to claim 1 wherein the regulated activity is health care.

9. A method of facilitating user compliance with laws that pertain to a regulated activity in each of a plurality of legal jurisdictions, the method comprising the steps of:

defining a set of components, wherein each component in the set relates to a respective aspect of the regulated activity;

for each component in the set, identifying laws of each legal jurisdiction that pertain to the respective component;

indicating elements of a component in the set that are common among two or more of the legal jurisdictions;

storing, in a data processing system, each legal requirement set forth in the identified laws of a legal jurisdiction as a respective element of a component in the set; and ranking the elements common among two or more of the legal jurisdictions according to legal requirement stringency.

10. A method according to claim 9 further comprising the step of indicating elements of a component in the set that are unique to a particular legal jurisdiction.

11. A method according to claim 9 wherein the regulated activity is health care.

12. A method of facilitating user compliance with laws that pertain to a regulated activity in each of a plurality of legal jurisdictions, the method comprising the steps of:

defining a set of components, wherein each component in the set relates to a respective aspect of the regulated activity;

for each component in the set, identifying laws of each legal jurisdiction that pertain to the respective component;

storing, in a data processing system, each legal requirement set forth in the identified laws of a legal jurisdiction as a respective element of a component in the set;

indicating elements of a component in the set that are unique to a particular legal jurisdiction;

indicating elements of a component in the set that are common among two or more of the legal jurisdictions;

selecting, via a user interface in communication with the data processing system, a component that relates to an aspect of the regulated activity;

selecting, via a user interface in communication with the data processing system, first and second legal jurisdictions from the plurality of legal jurisdictions;

displaying elements of the selected component that are unique to the first and second legal jurisdictions, respectively, wherein each displayed element is a legal requirement associated with the regulated activity as defined by laws of a respective legal jurisdiction; and ranking the elements common among two or more of the legal jurisdictions according to legal requirement stringency.

13. A method according to claim 12 further comprising the step of displaying elements of the selected component that are common to both the first and second legal jurisdictions.

14. A method according to claim 13 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

15. A method according to claim 12 wherein the step of displaying elements of the selected component that are unique to the first and second legal jurisdictions, respectively, further comprises the step of displaying respective portions of the laws of each legal jurisdiction that are associated with the respective displayed elements.

16. A method according to claim 12 wherein the step of displaying elements of the selected component that are common to the first and second legal jurisdictions, respectively, further comprises the step of displaying respective portions of the laws of each legal jurisdiction that are associated with the respective displayed elements.

17. A method according to claim 12 further comprising the step of displaying a list of elements that comply with the laws of both the first and second legal jurisdiction with respect to a selected regulated activity component.

18. A method according to claim 12 further comprising the step of selecting, via a user interface in communication with the data processing system, the regulated activity from a list of regulated activities, prior to the step of selecting a component of the regulated activity.

19. A method of practicing telemedicine using a first computer system in a first legal jurisdiction that is networked to a second computer system in a second legal jurisdiction, the method comprising the steps of:

selecting, via a user interface in communication with the first computer system, a component that relates to an aspect of telemedicine;

selecting, via a user interface in communication with the first computer system, first and second legal jurisdictions from the plurality of legal jurisdictions;

displaying elements of the selected component that are unique to the first and second legal jurisdictions, respectively, wherein each displayed element is a legal requirement associated with telemedicine as defined by laws of a respective legal jurisdiction;

displaying elements of the selected component that are common to both the first and second legal jurisdictions; and if in compliance with the displayed elements, practicing telemedicine.

20. A method according to claim 19 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

21. A method according to claim 19 wherein the step of displaying elements of the selected component that are unique to the first and second legal jurisdictions, respectively, further comprises the step of displaying respective portions of the laws of each legal jurisdiction that are associated with the respective displayed elements.

22. A method according to claim 19 wherein the step of displaying elements of the selected component that are common to the first and second legal jurisdictions, respectively, further comprises the step of displaying respective portions of the laws of each legal jurisdiction that are associated with the respective displayed elements.

23. A method according to claim 19 further comprising the step of displaying a list of elements that comply with the laws of both the first and second legal jurisdiction with respect to a selected telemedicine component.

24. A system for facilitating user compliance with laws that pertain to a regulated activity in each of a plurality of legal jurisdictions, comprising:

means for selecting, via a user interface in communication with a data processing system, a component that relates to an aspect of the regulated activity;

means for selecting, via a user interface in communication with the data processing system, first and second legal jurisdictions from the plurality of legal jurisdictions; and means for displaying elements of the selected component that are unique to the first and second legal jurisdictions, respectively, wherein each displayed element is a legal requirement associated with the regulated activity as defined by laws of a respective legal jurisdiction.

25. A system according to claim 24 further comprising means for displaying elements of the selected component that are common to both the first and second legal jurisdictions.

26. A system according to claim 25 wherein the means for displaying elements of the selected component that are common to both the first and second legal jurisdictions further comprises means for displaying an indication as to which of the displayed elements are associated with the first legal jurisdiction and which of the displayed elements are associated with the second legal jurisdiction.

27. A system according to claim 24 wherein the means for displaying elements of the selected component that are unique to the first and second legal jurisdictions, respectively, further comprises means for displaying respective portions of the laws of each legal jurisdiction that are associated with the respective displayed elements.

28. A system according to claim 24 wherein the means for displaying elements of the selected component that are common to the first and second legal jurisdictions, respectively, further comprises means for displaying respective portions of the laws of each legal jurisdiction that are associated with the respective displayed elements.

29. A system according to claim 24 further comprising means for displaying a list of elements that comply with the laws of both the first and second legal jurisdiction with respect to a selected regulated activity component.

30. A system according to claim 24 further comprising means for selecting, via a user interface in communication with the data processing system, the regulated activity from a list of regulated activities, prior to the step of selecting a component of the regulated activity.

31. A system for facilitating user compliance with laws that pertain to a regulated activity in each of a plurality of legal jurisdictions, comprising:

means for defining a set of components, wherein each component in the set relates to a respective aspect of the regulated activity;

means for identifying laws of each legal jurisdiction that pertain to each respective component in the set;

means for indicating elements of a component in the set that are common among two or more of the legal jurisdictions;

means for storing, in a data processing system, each legal requirement set forth in the identified laws of a legal jurisdiction as a respective element of a component in the set; and means for ranking the elements common among two or more of the legal jurisdictions according to legal requirement stringency.

32. A system according to claim 31 further comprising means for indicating elements of a component in the set that are unique to a particular legal jurisdiction.

33. A computer program product for facilitating user compliance with laws that pertain to a regulated activity in each of a plurality of legal jurisdictions, the computer program product comprising a computer usable storage medium having computer readable program code means embodied in the medium, the computer readable program code means comprising:

computer readable program code means for selecting, via a user interface in communication with a data processing system, a component that relates to an aspect of the regulated activity;

computer readable program code means for selecting, via a user interface in communication with the data processing system, first and second legal jurisdictions from the plurality of legal jurisdictions; and computer readable program code means for displaying elements of the selected component that are unique to the first and second legal jurisdictions, respectively, wherein each displayed element is a legal requirement associated with the regulated activity as defined by laws of a respective legal jurisdiction.

34. A computer program product according to claim 33 further comprising computer readable program code means for displaying elements of the selected component that are common to both the first and second legal jurisdictions.

35. A computer program product according to claim 34 wherein the computer readable program code means for displaying elements of the selected component that are common to both the first and second legal jurisdictions further comprises computer readable program code means for displaying an indication as to which of the displayed elements are associated with the first legal jurisdiction and which of the displayed elements are associated with the second legal jurisdiction.

36. A computer program product according to claim 33 wherein the computer readable program code means for displaying elements of the selected component that are unique to the first and second legal jurisdictions, respectively, further comprises computer readable program code means for displaying respective portions of the laws of each legal jurisdiction that are associated with the respective displayed elements.

37. A computer program product according to claim 33 wherein the computer readable program code means for displaying elements of the selected component that are common to the first and second legal jurisdictions, respectively, further comprises computer readable program code means for displaying respective portions of the laws of each legal jurisdiction that are associated with the respective displayed elements.

38. A computer program product according to claim 33 further comprising computer readable program code means for displaying a list of elements that comply with the laws of both the first and second legal jurisdiction with respect to a selected regulated activity component.

39. A computer program product according to claim 33 further comprising computer readable program code means for selecting, via a user interface in communication with the data processing system, the regulated activity from a list of regulated activities, prior to the step of selecting a component of the regulated activity.

40. A computer program product for facilitating user compliance with laws that pertain to a regulated activity in each of a plurality of legal jurisdictions, the computer program product comprising a computer usable storage medium having computer readable program code means embodied in the medium, the computer readable program code means comprising:

computer readable program code means for defining a set of components, wherein each component in the set relates to a respective aspect of the regulated activity;

computer readable program code means for identifying laws of each legal jurisdiction that pertain to each respective component in the set; and computer readable program code means for storing, in a data processing system, each legal requirement set forth in the identified laws of a legal jurisdiction as a respective element of a component in the set.

41. A computer program product according to claim 40 further comprising computer readable program code means for indicating elements of a component in the set that are unique to a particular legal jurisdiction.

42. A computer program product according to claim 40 further comprising computer readable program code means for indicating elements of a component in the set that are common among two or more of the legal jurisdictions.

43. A computer program product according to claim 42 further comprising computer readable program code means for ranking the elements common among two or more of the legal jurisdictions according to legal requirement stringency.

44. A method of facilitating user compliance with laws that pertain to a regulated activity in each of a plurality of legal jurisdictions, the method comprising the steps of:

selecting, via a user interface in communication with a data processing system, a component that relates to an aspect of the regulated activity;

selecting, via a user interface in communication with the data processing system, first and second legal jurisdictions from the plurality of legal jurisdictions;

displaying elements of the selected component that are unique to the first and second legal jurisdictions, respectively, wherein each displayed element is a legal requirement associated with the regulated activity as defined by laws of a respective legal jurisdiction; and displaying elements of the selected component that are common to both the first and second legal jurisdictions, comprising the step of displaying an indication as to which of the displayed elements are associated with the first legal jurisdiction and which of the displayed elements are associated with the second legal jurisdiction.

45. A method according to claim 44 wherein the step of displaying component elements common to the first and second legal jurisdictions further comprises the step of indicating whether the first or second legal jurisdiction has laws associated with each common element that are more stringent than laws of the respective other legal jurisdiction.

46. A method according to claim 44 wherein the step of displaying elements of the selected component that are unique to the first and second legal jurisdictions, respectively, further comprises the step of displaying respective portions of the laws of each legal jurisdiction that are associated with the respective displayed elements.

47. A method according to claim 44 wherein the step of displaying elements of the selected component that are common to the first and second legal jurisdictions, respectively, further comprises the step of displaying respective portions of the laws of each legal jurisdiction that are associated with the respective displayed elements.

48. A method according to claim 44 further comprising the step of displaying elements of the first legal jurisdiction within a first portion of a user interface and elements of the second legal jurisdiction within an adjacent second portion of the user interface.

49. A method according to claim 44 further comprising the step of displaying a list of elements that comply with the laws of both the first and second legal jurisdiction with respect to a selected regulated activity component.

50. A method according to claim 44 further comprising the step of selecting, via a user interface in communication with the data processing system, the regulated activity from a list of regulated activities, prior to the step of selecting a component of the regulated activity.

51. A method according to claim 44 wherein the regulated activity is health care.

52. A method of facilitating user compliance with laws that pertain to a regulated activity in each of a plurality of legal jurisdictions, the method comprising the steps of:
    selecting, via a user interface in communication with a data processing system, a component that relates to an aspect of the regulated activity;
    selecting, via a user interface in communication with the data processing system, first and second legal jurisdictions from the plurality of legal jurisdictions; and
    displaying elements of the selected component that are unique to the first and second legal jurisdictions, respectively, wherein each displayed element is a legal requirement associated with the regulated activity as defined by laws of a respective legal jurisdiction, wherein elements of the first legal jurisdiction are displayed within a first portion of a user interface and elements of the second legal jurisdiction are displayed within an adjacent second portion of the user interface.

53. A method according to claim 52 further comprising the step of displaying elements of the selected component that are common to both the first and second legal jurisdictions.

54. A method according to claim 53 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

55. A method according to claim 53 wherein the step of displaying component elements common to the first and second legal jurisdictions further comprises the step of indicating whether the first or second legal jurisdiction has laws associated with each common element that are more stringent than laws of the respective other legal jurisdiction.

56. A method according to claim 52 wherein the step of displaying elements of the selected component that are unique to the first and second legal jurisdictions, respectively, further comprises the step of displaying respective portions of the laws of each legal jurisdiction that are associated with the respective displayed elements.

57. A method according to claim 52 wherein the step of displaying elements of the selected component that are common to the first and second legal jurisdictions, respectively, further comprises the step of displaying respective portions of the laws of each legal jurisdiction that are associated with the respective displayed elements.

58. A method according to claim 52 further comprising the step of displaying a list of elements that comply with the laws of both the first and second legal jurisdiction with respect to a selected regulated activity component.

59. A method of facilitating user compliance with laws that pertain to a regulated activity in each of a plurality of legal jurisdictions, the method comprising the steps of:
    defining a set of components, wherein each component in the set relates to a respective aspect of the regulated activity;
    for each component in the set, identifying laws of each legal jurisdiction that pertain to the respective component;
    storing, in a data processing system, each legal requirement set forth in the identified laws of a legal jurisdiction as a respective element of a component in the set;
    indicating elements of a component in the set that are unique to a particular legal jurisdiction;
    indicating elements of a component in the set that are common among two or more of the legal jurisdictions;
    selecting, via a user interface in communication with the data processing system, a component that relates to an aspect of the regulated activity;
    selecting, via a user interface in communication with the data processing system, first and second legal jurisdictions from the plurality of legal jurisdictions;
    displaying elements of the selected component that are unique to the first and second legal jurisdictions, respectively, wherein each displayed element is a legal requirement associated with the regulated activity as defined by laws of a respective legal jurisdiction;
    displaying elements of the selected component that are common to both the first and second legal jurisdictions; and
    indicating whether the first or second legal jurisdiction has laws associated with each common element that are more stringent than laws of the respective other legal jurisdiction.

60. A method according to claim 59 further comprising the step of ranking the elements common among two or more of the legal jurisdictions according to legal requirement stringency.

61. A method according to claim 59 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

62. A method according to claim 59 wherein the step of displaying elements of the selected component that are unique to the first and second legal jurisdictions, respectively, further comprises the step of displaying respective portions of the laws of each legal jurisdiction that are associated with the respective displayed elements.

63. A method according to claim 59 wherein the step of displaying elements of the selected component that are common to the first and second legal jurisdictions, respectively, further comprises the step of displaying respective portions of the laws of each legal jurisdiction that are associated with the respective displayed elements.

64. A method according to claim 59 further comprising the step of displaying elements of the first legal jurisdiction within a first portion of a user interface and elements of the second legal jurisdiction within an adjacent second portion of the user interface.

65. A method according to claim 59 further comprising the step of displaying a list of elements that comply with the laws of both the first and second legal jurisdiction with respect to a selected regulated activity component.

66. A method of facilitating user compliance with laws that pertain to a regulated activity in each of a plurality of legal jurisdictions, the method comprising the steps of:

defining a set of components, wherein each component in the set relates to a respective aspect of the regulated activity;

for each component in the set, identifying laws of each legal jurisdiction that pertain to the respective component;

storing, in a data processing system, each legal requirement set forth in the identified laws of a legal jurisdiction as a respective element of a component in the set;

indicating elements of a component in the set that are unique to a particular legal jurisdiction;

indicating elements of a component in the set that are common among two or more of the legal jurisdictions;

selecting, via a user interface in communication with the data processing system, a component that relates to an aspect of the regulated activity;

selecting, via a user interface in communication with the data processing system, first and second legal jurisdictions from the plurality of legal jurisdictions; and displaying elements of the selected component that are unique to the first and second legal jurisdictions, respectively, wherein each displayed element is a legal requirement associated with the regulated activity as defined by laws of a respective legal jurisdiction, and wherein elements of the first legal jurisdiction are displayed within a first portion of a user interface and elements of the second legal jurisdiction are displayed within an adjacent second portion of the user interface.

67. A method according to claim 66 further comprising the step of ranking the elements common among two or more of the legal jurisdictions according to legal requirement stringency.

68. A method according to claim 66 further comprising the step of displaying elements of the selected component that are common to both the first and second legal jurisdictions.

69. A method according to claim 68 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

70. A method according to claim 68 wherein the step of displaying component elements common to the first and second legal jurisdictions further comprises the step of indicating whether the first or second legal jurisdiction has laws associated with each common element that are more stringent than laws of the respective other legal jurisdiction.

71. A method according to claim 66 wherein the step of displaying elements of the selected component that are unique to the first and second legal jurisdictions, respectively, further comprises the step of displaying respective portions of the laws of each legal jurisdiction that are associated with the respective displayed elements.

72. A method according to claim 66 wherein the step of displaying elements of the selected component that are common to the first and second legal jurisdictions, respectively, further comprises the step of displaying respective portions of the laws of each legal jurisdiction that are associated with the respective displayed elements.

73. A method according to claim 66 further comprising the step of displaying a list of elements that comply with the laws of both the first and second legal jurisdiction with respect to a selected regulated activity component.

74. A method of practicing telemedicine using a first computer system in a first legal jurisdiction that is networked to a second computer system in a second legal jurisdiction, the method comprising the steps of:

selecting, via a user interface in communication with the first computer system, a component that relates to an aspect of telemedicine;

selecting, via a user interface in communication with the first computer system, first and second legal jurisdictions from the plurality of legal jurisdictions;

displaying elements of the selected component that are unique to the first and second legal jurisdictions, respectively, wherein each displayed element is a legal requirement associated with telemedicine as defined by laws of a respective legal jurisdiction;

displaying elements of the selected component that are common to both the first and second legal jurisdictions comprising indicating whether the first or second legal jurisdiction has laws associated with each common element that are more stringent than laws of the respective other legal jurisdiction; and if in compliance with the displayed elements, practicing telemedicine.

75. A method according to claim 74 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

76. A method according to claim 74 wherein the step of displaying elements of the selected component that are unique to the first and second legal jurisdictions, respectively, further comprises the step of displaying respective portions of the laws of each legal jurisdiction that are associated with the respective displayed elements.

77. A method according to claim 74 wherein the step of displaying elements of the selected component that are common to the first and second legal jurisdictions, respectively, further comprises the step of displaying respective portions of the laws of each legal jurisdiction that are associated with the respective displayed elements.

78. A method according to claim 74 further comprising the step of displaying elements of the first legal jurisdiction within a first portion of a user interface and elements of the second legal jurisdiction within an adjacent second portion of the user interface.

79. A method according to claim 74 further comprising the step of displaying a list of elements that comply with the laws of both the first and second legal jurisdiction with respect to a selected telemedicine component.

80. A method of practicing telemedicine using a first computer system in a first legal jurisdiction that is networked to a second computer system in a second legal jurisdiction, the method comprising the steps of:
  selecting, via a user interface in communication with the first computer system, a component that relates to an aspect of telemedicine;
  selecting, via a user interface in communication with the first computer system, first and second legal jurisdictions from the plurality of legal jurisdictions;
  displaying elements of the selected component that are unique to the first and second legal jurisdictions, respectively, wherein each displayed element is a legal requirement associated with telemedicine as defined by laws of a respective legal jurisdiction;
  displaying elements of the selected component that are common to both the first and second legal jurisdictions;
  wherein elements of the first legal jurisdiction are displayed within a first portion of a user interface and elements of the second legal jurisdiction are displayed within an adjacent second portion of the user interface; and
  if in compliance with the displayed elements, practicing telemedicine.

81. A method according to claim 80 wherein the step of displaying elements of the selected component that are common to both the first and second legal jurisdictions further comprises the step of displaying an indication as to which of the displayed elements are associated with the first legal jurisdiction and which of the displayed elements are associated with the second legal jurisdiction.

82. A method according to claim 80 wherein the step of displaying component elements common to the first and second legal jurisdictions further comprises the step of indicating whether the first or second legal jurisdiction has laws associated with each common element that are more stringent than laws of the respective other legal jurisdiction.

83. A method according to claim 80 wherein the step of displaying elements of the selected component that are unique to the first and second legal jurisdictions, respectively, further comprises the step of displaying respective portions of the laws of each legal jurisdiction that are associated with the respective displayed elements.

84. A method according to claim 80 wherein the step of displaying elements of the selected component that are common to the first and second legal jurisdictions, respectively, further comprises the step of displaying respective portions of the laws of each legal jurisdiction that are associated with the respective displayed elements.

85. A method according to claim 80 further comprising the step of displaying a list of elements that comply with the laws of both the first and second legal jurisdiction with respect to a selected telemedicine component.

86. A system for facilitating user compliance with laws that pertain to a regulated activity in each of a plurality of legal jurisdictions, comprising:
  means for selecting, via a user interface in communication with a data processing system, a component that relates to an aspect of the regulated activity;
  means for selecting, via a user interface in communication with the data processing system, first and second legal jurisdictions from the plurality of legal jurisdictions;
  means for displaying elements of the selected component that are unique to the first and second legal jurisdictions, respectively, wherein each displayed element is a legal requirement associated with the regulated activity as defined by laws of a respective legal jurisdiction; and
  means for displaying elements of the selected component that are common to both the first and second legal jurisdictions comprising means for indicating whether the first or second legal jurisdiction has laws associated with each common element that are more stringent than laws of the respective other legal jurisdiction.

87. A system according to claim 86 wherein the means for displaying elements of the selected component that are common to both the first and second legal jurisdictions further comprises means for displaying an indication as to which of the displayed elements are associated with the first legal jurisdiction and which of the displayed elements are associated with the second legal jurisdiction.

88. A system according to claim 86 wherein the means for displaying elements of the selected component that are unique to the first and second legal jurisdictions, respectively, further comprises means for displaying respective portions of the laws of each legal jurisdiction that are associated with the respective displayed elements.

89. A system according to claim 86 wherein the means for displaying elements of the selected component that are common to the first and second legal jurisdictions, respectively, further comprises means for displaying respective portions of the laws of each legal jurisdiction that are associated with the respective displayed elements.

90. A system according to claim 86 further comprising means for displaying elements of the first legal jurisdiction within a first portion of a user interface and elements of the second legal jurisdiction within an adjacent second portion of the user interface.

91. A system according to claim 86 further comprising means for displaying a list of elements that comply with the laws of both the first and second legal jurisdiction with respect to a selected regulated activity component.

92. A system for facilitating user compliance with laws that pertain to a regulated activity in each of a plurality of legal jurisdictions, comprising:
  means for selecting, via a user interface in communication with a data processing system, a component that relates to an aspect of the regulated activity;
  means for selecting, via a user interface in communication with the data processing system, first and second legal jurisdictions from the plurality of legal jurisdictions;
  means for displaying elements of the selected component that are unique to the first and second legal jurisdictions, respectively, wherein each displayed element is a legal requirement associated with the regulated activity as defined by laws of a respective legal jurisdiction; and
  means for displaying elements of the first legal jurisdiction within a first portion of a user interface and elements of the second legal jurisdiction within an adjacent second portion of the user interface.

93. A system according to claim 92 further comprising means for displaying elements of the selected component that are common to both the first and second legal jurisdictions.

94. A system according to claim 93 wherein the means for displaying elements of the selected component that are common to both the first and second legal jurisdictions further comprises means for displaying an indication as to which of the displayed elements are associated with the first legal jurisdiction and which of the displayed elements are associated with the second legal jurisdiction.

95. A system according to claim 93 wherein the means for displaying component elements common to the first and second legal jurisdictions further comprises means for indicating whether the first or second legal jurisdiction has laws associated with each common element that are more stringent than laws of the respective other legal jurisdiction.

96. A system according to claim 92 wherein the means for displaying elements of the selected component that are unique to the first and second legal jurisdictions, respectively, further comprises means for displaying respective portions of the laws of each legal jurisdiction that are associated with the respective displayed elements.

97. A system according to claim 92 wherein the means for displaying elements of the selected component that are common to the first and second legal jurisdictions, respectively, further comprises means for displaying respective portions of the laws of each legal jurisdiction that are associated with the respective displayed elements.

98. A system according to claim 92 further comprising means for displaying a list of elements that comply with the laws of both the first and second legal jurisdiction with respect to a selected regulated activity component.

99. A computer program product for facilitating user compliance with laws that pertain to a regulated activity in each of a plurality of legal jurisdictions, the computer program product comprising a computer usable storage medium having computer readable program code means embodied in the medium, the computer readable program code means comprising:

computer readable program code means for selecting, via a user interface in communication with a data processing system, a component that relates to an aspect of the regulated activity;

computer readable program code means for selecting, via a user interface in communication with the data processing system, first and second legal jurisdictions from the plurality of legal jurisdictions;

computer readable program code means for displaying elements of the selected component that are unique to the first and second legal jurisdictions, respectively, wherein each displayed element is a legal requirement associated with the regulated activity as defined by laws of a respective legal jurisdiction; and computer readable program code means for displaying elements of the selected component that are common to both the first and second legal jurisdictions, wherein the computer readable program code means for displaying component elements common to the first and second legal jurisdictions further comprises computer readable program code means for indicating whether the first or second legal jurisdiction has laws associated with each common element that are more stringent than laws of the respective other legal jurisdiction.

100. A computer program product according to claim 99 wherein the computer readable program code means for displaying elements of the selected component that are common to both the first and second legal jurisdictions further comprises computer readable program code means for displaying an indication as to which of the displayed elements are associated with the first legal jurisdiction and which of the displayed elements are associated with the second legal jurisdiction.

101. A computer program product according to claim 99 wherein the computer readable program code means for displaying elements of the selected component that are unique to the first and second legal jurisdictions, respectively, further comprises computer readable program code means for displaying respective portions of the laws of each legal jurisdiction that are associated with the respective displayed elements.

102. A computer program product according to claim 99 wherein the computer readable program code means for displaying elements of the selected component that are common to the first and second legal jurisdictions, respectively, further comprises computer readable program code means for displaying respective portions of the laws of each legal jurisdiction that are associated with the respective displayed elements.

103. A computer program product according to claim 99 further comprising computer readable program code means for displaying elements of the first legal jurisdiction within a first portion of a user interface and elements of the second legal jurisdiction within an adjacent second portion of the user interface.

104. A computer program product according to claim 99 further comprising computer readable program code means for displaying a list of elements that comply with the laws of both the first and second legal jurisdiction with respect to a selected regulated activity component.

105. A computer program product for facilitating user compliance with laws that pertain to a regulated activity in each of a plurality of legal jurisdictions, the computer program product comprising a computer usable storage medium having computer readable program code means embodied in the medium, the computer readable program code means comprising:

computer readable program code means for selecting, via a user interface in communication with a data processing system, a component that relates to an aspect of the regulated activity;

computer readable program code means for selecting, via a user interface in communication with the data processing system, first and second legal jurisdictions from the plurality of legal jurisdictions;

computer readable program code means for displaying elements of the selected component that are unique to the first and second legal jurisdictions, respectively, wherein each displayed element is a legal requirement associated with the regulated activity as defined by laws of a respective legal jurisdiction; and computer readable program code means for displaying elements of the first legal jurisdiction within a first portion of a user interface and elements of the second legal jurisdiction within an adjacent second portion of the user interface.

106. A computer program product according to claim 105 further comprising computer readable program code means for displaying elements of the selected component that are common to both the first and second legal jurisdictions.

107. A computer program product according to claim 106 wherein the computer readable program code means for displaying elements of the selected component that are common to both the first and second legal jurisdictions further comprises computer readable program code means for displaying an indication as to which of the displayed elements are associated with the first legal jurisdiction and which of the displayed elements are associated with the second legal jurisdiction.

108. A computer program product according to claim 106 wherein the computer readable program code means for displaying component elements common to the first and second legal jurisdictions further comprises computer readable program code means for indicating whether the first or second legal jurisdiction has laws associated with each common element that are more stringent than laws of the respective other legal jurisdiction.

109. A computer program product according to claim 105 wherein the computer readable program code means for displaying elements of the selected component that are unique to the first and second legal jurisdictions, respectively, further comprises computer readable program code means for displaying respective portions of the laws of each legal jurisdiction that are associated with the respective displayed elements.

110. A computer program product according to claim 105 wherein the computer readable program code means for displaying elements of the selected component that are common to the first and second legal jurisdictions, respectively, further comprises computer readable program code means for displaying respective portions of the laws of each legal jurisdiction that are associated with the respective displayed elements.

111. A computer program product according to claim 105 further comprising computer readable program code means for displaying a list of elements that comply with the laws of both the first and second legal jurisdiction with respect to a selected regulated activity component.

* * * * *